(12) United States Patent
Axelrod et al.

(10) Patent No.: US 11,602,129 B2
(45) Date of Patent: Mar. 14, 2023

(54) DENTAL CHEW TOY

(71) Applicant: T.F.H. PUBLICATIONS, INC., Neptune City, NJ (US)

(72) Inventors: Glen S. Axelrod, Colts Neck, NJ (US); Ajay Gajria, Maharashtra (IN); Diana M. Echeverri, Beachwood, NJ (US)

(73) Assignee: T.F.H. PUBLICATIONS, INC., Neptune City, NJ (US)

( * ) Notice: Subject to any disclaimer, the term of this patent is extended or adjusted under 35 U.S.C. 154(b) by 51 days.

(21) Appl. No.: 17/247,098

(22) Filed: Nov. 30, 2020

(65) Prior Publication Data
US 2022/0167589 A1 Jun. 2, 2022

(51) Int. Cl.
*A01K 15/02* (2006.01)

(52) U.S. Cl.
CPC .................................. *A01K 15/026* (2013.01)

(58) Field of Classification Search
CPC .... A01K 15/026; A01K 15/025; A01K 15/02; A01K 29/00; A61D 5/00
See application file for complete search history.

(56) References Cited

U.S. PATENT DOCUMENTS

| | | | |
|---|---|---|---|
| 3,853,412 A | 12/1974 | Griffin | |
| 5,857,431 A * | 1/1999 | Peterson | F04B 9/02 119/710 |
| 5,944,516 A | 8/1999 | Deshaies | |
| 6,067,941 A * | 5/2000 | Axelrod | A01K 15/026 119/710 |
| 6,405,681 B1 | 6/2002 | Ward | |
| 6,739,287 B1 | 5/2004 | Sarantis | |
| 9,788,526 B2 | 10/2017 | Mann | |
| 9,844,207 B1 | 12/2017 | Wright et al. | |
| 2007/0015100 A1 | 1/2007 | Morris | |
| 2011/0011351 A1 | 1/2011 | Simoni | |
| 2014/0137809 A1 * | 5/2014 | Bianchi | A01K 15/026 119/709 |
| 2014/0245967 A1 | 9/2014 | Glaser | |
| 2019/0166800 A1 | 6/2019 | Axelrod et al. | |

FOREIGN PATENT DOCUMENTS

WO 2016134116 8/2016

OTHER PUBLICATIONS

International Search Report and Written Opinion from corresponding PCT Appln. No. PCT/US21/72478, dated Feb. 8, 2022.

* cited by examiner

*Primary Examiner* — Trinh T Nguyen
(74) *Attorney, Agent, or Firm* — Grossman, Tucker, Perreault & Pfleger, PLLC

(57) ABSTRACT

The present disclosure is directed to products and methods useful for a dental chew toy capable of stimulating and/or cleaning the tooth surfaces and/or gums of a domesticated animal. The dental chew toy includes a plurality of flexible dental elements extending outward from a core member. A relatively flexible outer cover surrounds the core member and the plurality of dental elements. A plurality of apertures formed in the outer cover allow passage of the dental elements when the outer cover is compressed via chewing action of the animal. Hollow tubes may surround the dental elements to guide the dental elements through the apertures formed in the outer cover.

17 Claims, 4 Drawing Sheets

DENTAL CHEW TOY

FIELD

The present disclosure relates to pet toys, more specifically to pet chew toys having dental cleaning capabilities.

BACKGROUND

Many animals have a natural instinct to chew. Such chewing behaviors may be caused by various feelings such as boredom, anxiety, or frustration. To avoid having pets chew on desirable items such as furniture, walls, and doors, many pet owners provide their pets with toys and other objects suitable for chewing. Often these chew toys are solid, semi-rigid objects having a degree of resiliency that prevents the immediate destruction of the object by the pet. However, such chew toys typically provide minimal dental cleaning or gum stimulation, both of which are recommended to maintain dental health in pets.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Although the following Detailed Description will proceed with reference being made to illustrative and preferred embodiments, many alternatives, modifications and variations thereof will be apparent to those skilled in the art.

DETAILED DESCRIPTION

The pet dental chew toy disclosed herein beneficially and advantageously provides dental cleaning and/or gum stimulation to pets while as the toy is chewed. The systems disclosed herein include a core member to which a plurality of dental elements are engaged. Preferably, each of the dental elements is engaged to the core member and extends radially outward from the core member. A relatively flexible and relatively resilient outer cover is disposed about the plurality of dental elements. The outer cover preferably does not rotate about the core member and instead, preferably remains in a fixed orientation with respect to the core member. Reference to the feature that the outer cover or the core member is relatively flexible and relatively resilient, is reference to the feature that the cover and/or core member may be repeatedly deformed by the chewing action of the animal and then generally recover to its original position so that the chew toy remains useful over time.

A plurality of apertures is formed in the outer cover. Each of the plurality of apertures is located proximate a second end of a respective one of the plurality of dental elements such that as the outer cover is collapsed by the chewing action of the pet, the dental elements are exposed via passage through the aperture. In some instances, the dental elements may include a plurality of bristles (i.e. fibers or fiber bundles that can serve to brush the animal's teeth and which preferably are made of nylon). Preferably, the outer cover may include a plurality of sleeves that extend inwardly from the outer cover. Each of the plurality of sleeves may be disposed about a respective one of the plurality of dental elements.

A dental chew toy is provided. The dental chew toy preferably includes: a core member; a plurality of dental elements affixed to the core member and extending radially outward from the core member, each of the dental elements having a first end coupled to the core member and a second end distal from the core member. A relatively flexible outer cover is disposed about all or a portion of the core member and having a plurality of apertures formed therethrough, each of the plurality of apertures disposed proximate the second end of a respective one of the plurality of dental elements, each of the plurality of dental elements to pass through the respective aperture upon exertion of a compressive force on the outer cover.

Figure 1:
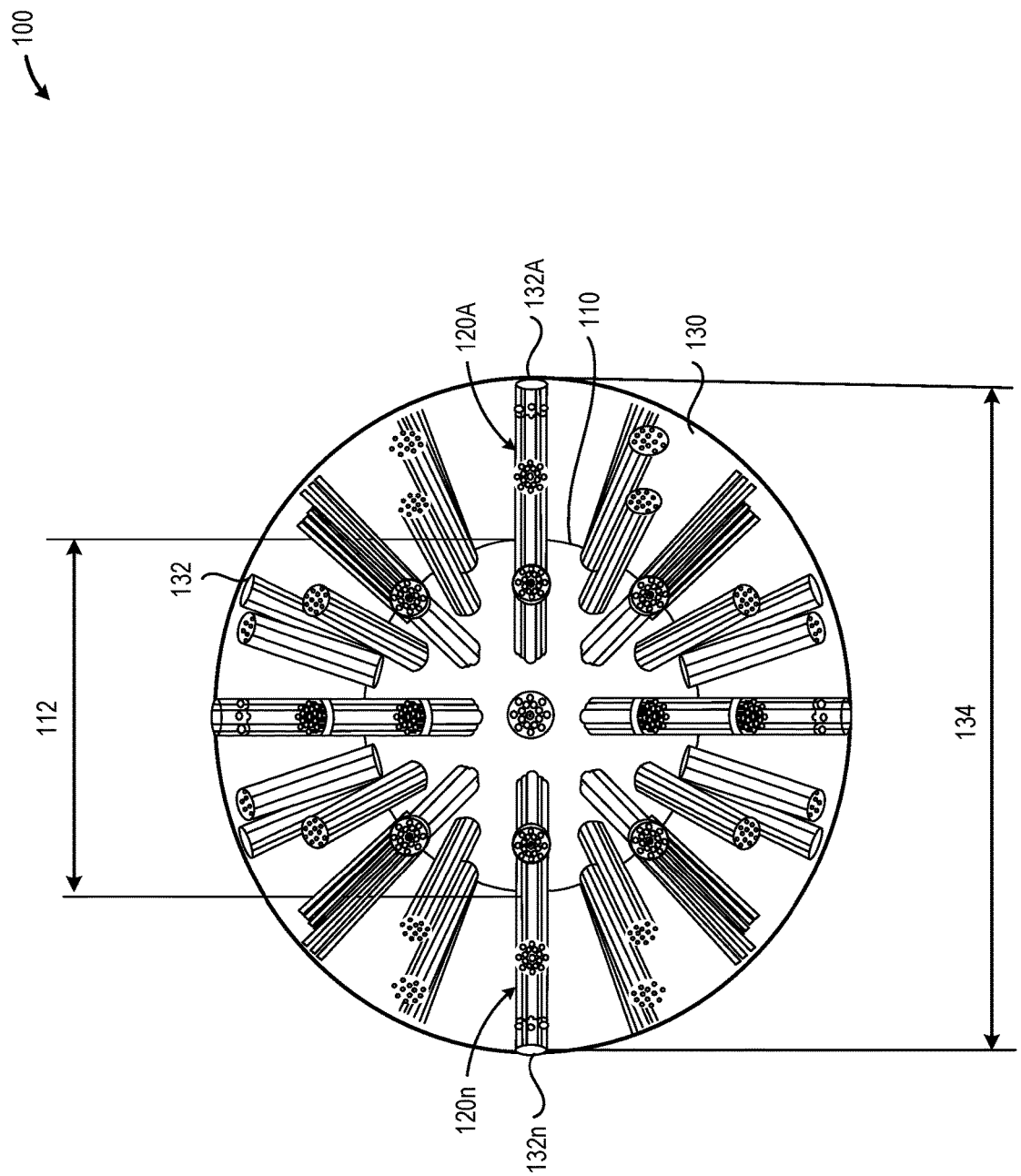
FIG. 1 is an elevation view depicting an illustrative dental chew toy that includes a core member, a plurality of dental elements, and an outer cover, in accordance with at least one embodiment described herein.

FIG. 1 is an elevation view depicting an illustrative dental chew toy 100 that includes a core member 110, a plurality of dental elements 120A-120*n* (collectively, "dental elements 120"), and an outer cover 130. As depicted in FIG. 1, in some embodiments, each of the plurality of dental elements 120A-120*n* may include a plurality of bristles arranged generally parallel to each other and extending radially outward from the core member 110. Also, as depicted in FIG. 1, a plurality of apertures 132A-132*n* (collectively, "apertures 132") may be formed in the outer cover 130. Each of the plurality of apertures 132A-132*n* may be disposed proximate a respective one of the plurality of dental elements 120A-120*n* such that as the outer cover 130 is deformed or collapsed, for example via the chewing action of a pet, the dental elements 120 pass through the aperture and become exposed on the external surface of the outer cover, thereby contacting the tooth and gum surfaces of the pet.

The core member 110 preferably may be composed of a relatively flexible material. In the case of a flexible material, the core member is one that may be compressed by the chewing action of the animal. The core member may also be relatively rigid, such that the core member is one that is not compressed by the chewing action of the animal. Although depicted as a generally spherical member in FIG. 1, the core member 110 may have any physical shape, form, or geometry. For example, the core member may be fabricated having a "dog bone" or similar physical geometry. The core member 110 may include a solid or hollow member. The dental elements 120 are then engaged to the external surface of the core member 110. For example, the dental elements may be engaged to the core member via mechanical coupling, melt bonding or adhesively bonding.

The core member may be defined by a diameter. For example, a spherical core member 110 may preferably have a diameter of about 1 inch or less; 1.5 inches or less; 2 inches or less; 2.5 inches or less; 3 inches or less or 4 inches or less. The core member 110 may preferably be fabricated using one or more thermoplastic polymers such as nylon, polyethylene, polypropylene, polyesters, or similar. The core member may also be preferably selected from silicone elastomer, polyurethane elastomer, polyester elastomer, or natural rubber. In embodiments, the core member 110 may preferably include a hollow member having one or more sound producing devices, such as a bell or similar, disposed therein. In embodiments, the core member 110 may preferably include a transparent, translucent, or semi-transparent hollow member having one or more visual output devices, such as a small LED device, disposed therein.

In embodiments, the core member 110 may also be configured to contain a formulation that may be released via one or more apertures 111 in the core member, upon a compression force supplied by the animal, which formulation is then released via one or more apertures 111 (FIG. 2) preferably positioned on the outer perimeter of the core member onto and along the dental elements 120A. The formulation may be present as a liquid or paste, e.g. a relatively viscous substance with a viscosity in the range of 500 centipoise to 250,000 centipoise. The one or more apertures 111 on the core member 110 may therefore be located anywhere on the outer perimeter surface of the core member 110. Preferably, the one or more apertures 111 are positioned at the location where the dental elements 120A-120n are attached to the core member 110. The formulation may include, e.g., breath freshener compositions or compositions that reduce dental calculus, such as compositions containing hexametaphosphate, or hexametaphosphate in combination with ascorbic acid and beta glucans.

The core member may preferably include a one-way valve 113. This would then provide for the ability to introduce and repeatedly fill and charge the core member with a desired formulation for release, as noted herein. In addition, the core member 110 may be conveniently formed by two separate portions 110A and 110B (FIG. 3A) that releasably mechanically engage one another at location 110C and therefore separate as desired. For example, the two separate portions 110A and 110B may mechanically engage by preferably screwing together followed by disengaging by unscrewing, such that the inner region of the core member can again be accessed and repeatedly filled with a desired formulation for release when chewed upon and compressed by the animal.

The plurality of dental elements 120 include any number and/or combination of relatively flexible members extending radially outward from the core member 110. In embodiments, each of the plurality of dental elements has a length and includes a first end proximate and coupled or bonded to the core member 110 and a second end distal from the core member 110. In embodiments, each of the plurality of dental elements 120 may preferably include a plurality of fiber members using one or more synthetic materials (e.g. nylon, polypropylene, polyethylene, high density polyethylene). One may also utilize a natural material such as bamboo viscose (a regenerated cellulose fiber). The fiber members are preferably understood as elongated structures—also referred to as bristles—and may preferably have a thickness in the range of 0.05 mm to 0.30 mm. The plurality of dental elements 120 may preferably be distributed in a uniform pattern and/or random pattern across all or a portion of the external surface of the core member 110.

In embodiments, each of the plurality of dental elements 120 may have a desired length. For example, each of the dental elements 120 may preferably have a length of about: 0.5 inches or less; 0.75 inches or less; 1 inch or less; 1.25 inches or less; 1.5 inches or less; 1.75 inches, or less, 2 inches or less; 2.5 inches or less; or 3 inches or less. In other embodiments, each of the plurality of dental elements 120 may have a length based on the diameter of the core member 110. For example, each of the dental elements 120 may preferably have a length of about: 10% or less; 20% or less; 25% or less; 30% or less, 40% or less, 50% or less; 60% or less; or 75% or less of the diameter 112 of the core member 110.

The outer cover 130 preferably includes a relatively flexible member having a plurality of apertures 132A-132n formed therethrough. As depicted in FIG. 1, each of the plurality apertures 132 may preferably be disposed proximate the second end of a respective one of the plurality of dental elements 120A-120n such that as the outer cover 130 is compressed, the dental elements 120 pass through the outer cover 130, exposing the dental elements 120 outside the outer cover 130.

Although the outer cover 130 is depicted as a generally spherical member in FIG. 1, the outer cover 130 may have any physical shape, form, or geometry. The outer cover 130 may have a similar physical geometry to the core member 110—for example, if the core member 110 includes a "dog bone" shape, the outer cover 130 may also include a physically larger, but similar, "dog bone" shape. In embodiments, the outer cover 130 may preferably be physically affixed or coupled to the core member 110 to prevent displacement of the outer cover 130 with respect to the core member 110, thereby maintaining alignment of the plurality of apertures 132 with the plurality of dental elements 120. The outer cover 130 may preferably be fabricated using any relatively flexible, biosafe, material, for example silicone elastomer, polyurethane elastomer, polyester elastomer or natural rubber. In embodiments, the outer cover 130 may include one or more bactericidal materials.

In applications where the outer cover 130 includes a relatively flexible, spherical, member, the outer cover 130 may have a desired diameter 134. For example, the outer cover 130 may preferably have a diameter 134 of about 2 inches or less; 2.5 inches or less; 3 inches or less; 4 inches or less; 5 inches or less or 6 inches or less. In some embodiments, the outer cover 130 may preferably have a diameter 134 of about: 150% or more; 200% or more; 250% or more; or 300% or more of the diameter 112 of the core member 110. Each of the plurality of apertures 132 may preferably have the same or a different diameter. The diameter of each of the apertures 132 is preferably sufficient to allow the unobstructed passage of the respective dental element 120 disposed proximate the aperture 132. In embodiments, each of the plurality of apertures 132 may preferably have a diameter of about: 0.25 inches or less; 0.375 inches or less; 0.5 inches or less; 0.625 inches or less; 0.75 inches or less; or 0.875 inches or less.

Figure 2:
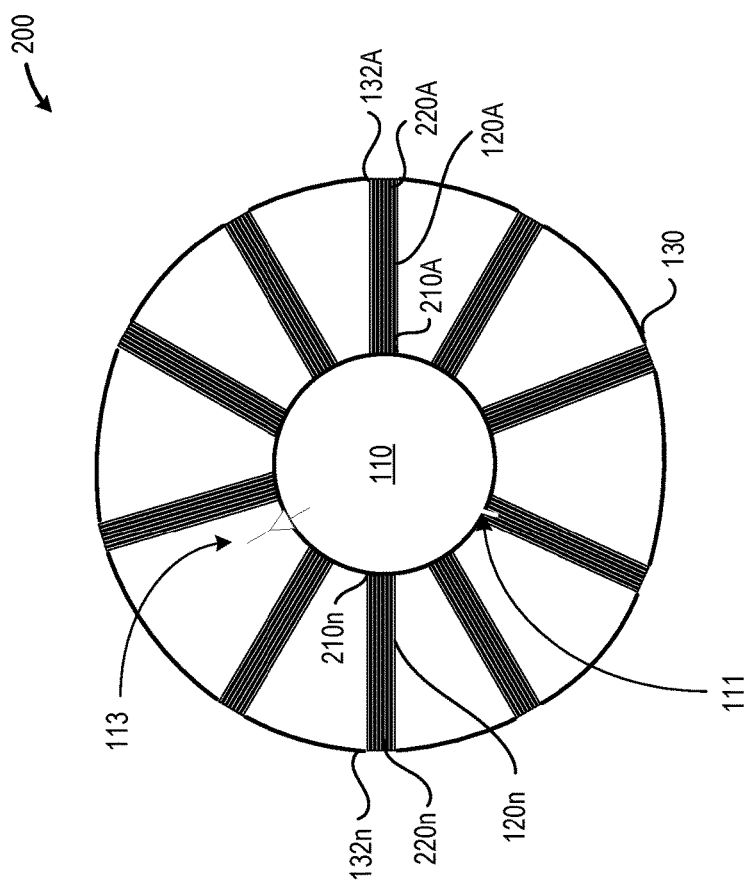
FIG. 2 is a cross-sectional elevation depicting an illustrative dental chew toy, in accordance with at least one embodiment described herein.

FIG. 2 is a cross-sectional elevation depicting an illustrative dental chew toy 200, in accordance with at least one preferred embodiment described herein. As depicted in FIG. 2, the first end 210A-210n (collectively, "first ends 210") of each of the plurality of dental elements 120A-120n is disposed proximate the external surface of the core member 110. In embodiments, the first ends 210A-210n of each of the plurality of dental elements 120A-120n may be coupled or affixed to the external surface of the core member 110. The second ends 220A-220n (collectively, "second ends 220") of each of the plurality of dental elements 120A-120n may be disposed proximate respective ones of the plurality of apertures 132A-132n.

Figure 3:
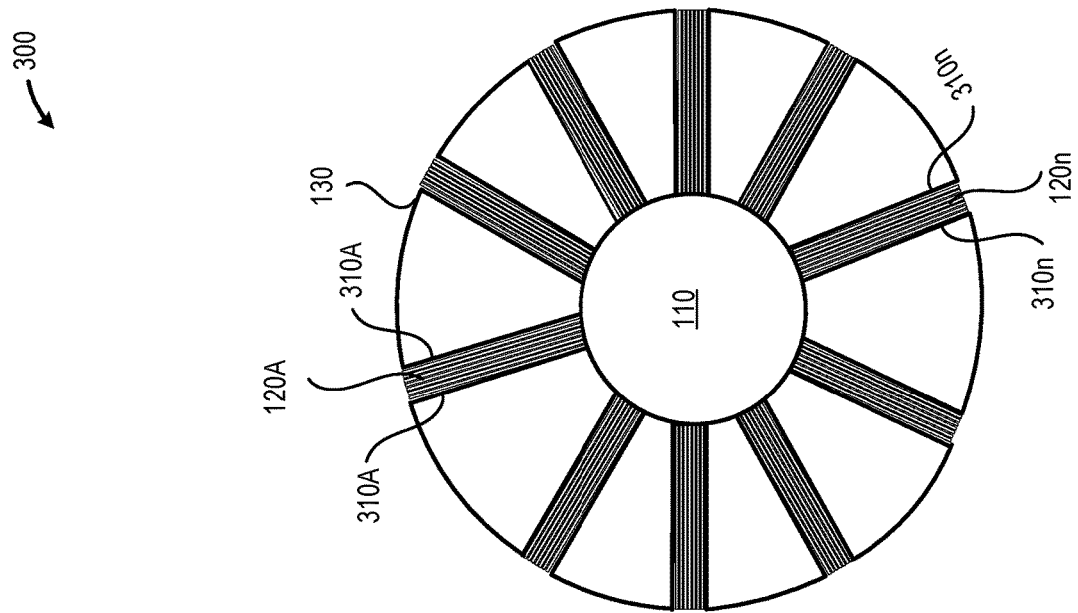
FIG. 3 is a cross-sectional elevation depicting another illustrative dental chew toy, in accordance with at least one embodiment described herein.
Figure 3A:
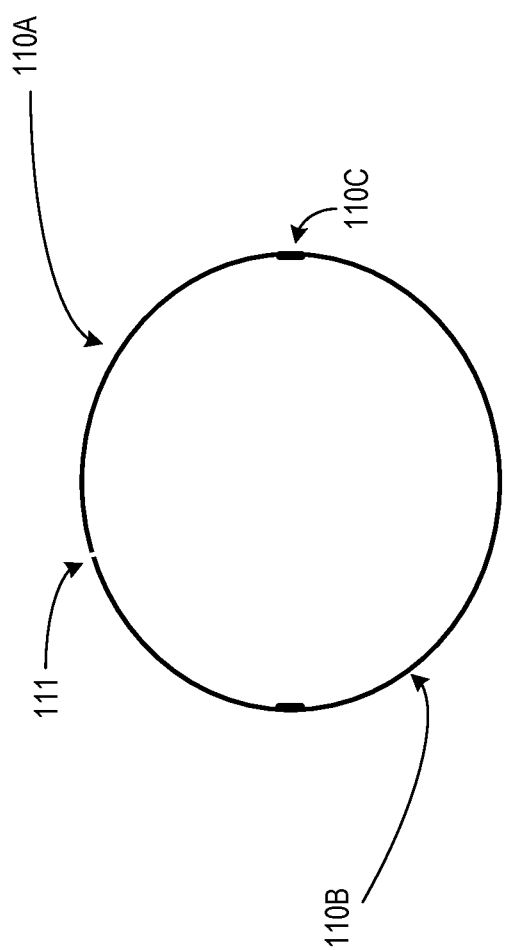
FIG. 3A is a cross-section view of the core member illustrating mechanical engage of two core member portions.

FIG. 3 is a cross-sectional elevation depicting another illustrative dental chew toy 300. As depicted in FIG. 3, in some preferred embodiments, a tubular structure 310A-310n (collectively, "tubular structures 310") may extend from the outer cover 130 at least partially along the length of one or a plurality or even all of the plurality of dental elements 120A-120n. In embodiments, the tubular structures 310A-310n may physically couple to the external surface of the core member 110. In addition, the outer cover 130 may then couple to one or more of the tubular structures. The tubular structures 310 beneficially guide the dental elements 120 through the apertures 132 formed in the outer cover 130. In embodiments, the tubular structures 310 may preferably be fabricated integral with the outer cover 130 and therefore may preferably include the same material as used in fabricating the outer cover 130.

Figure 4:
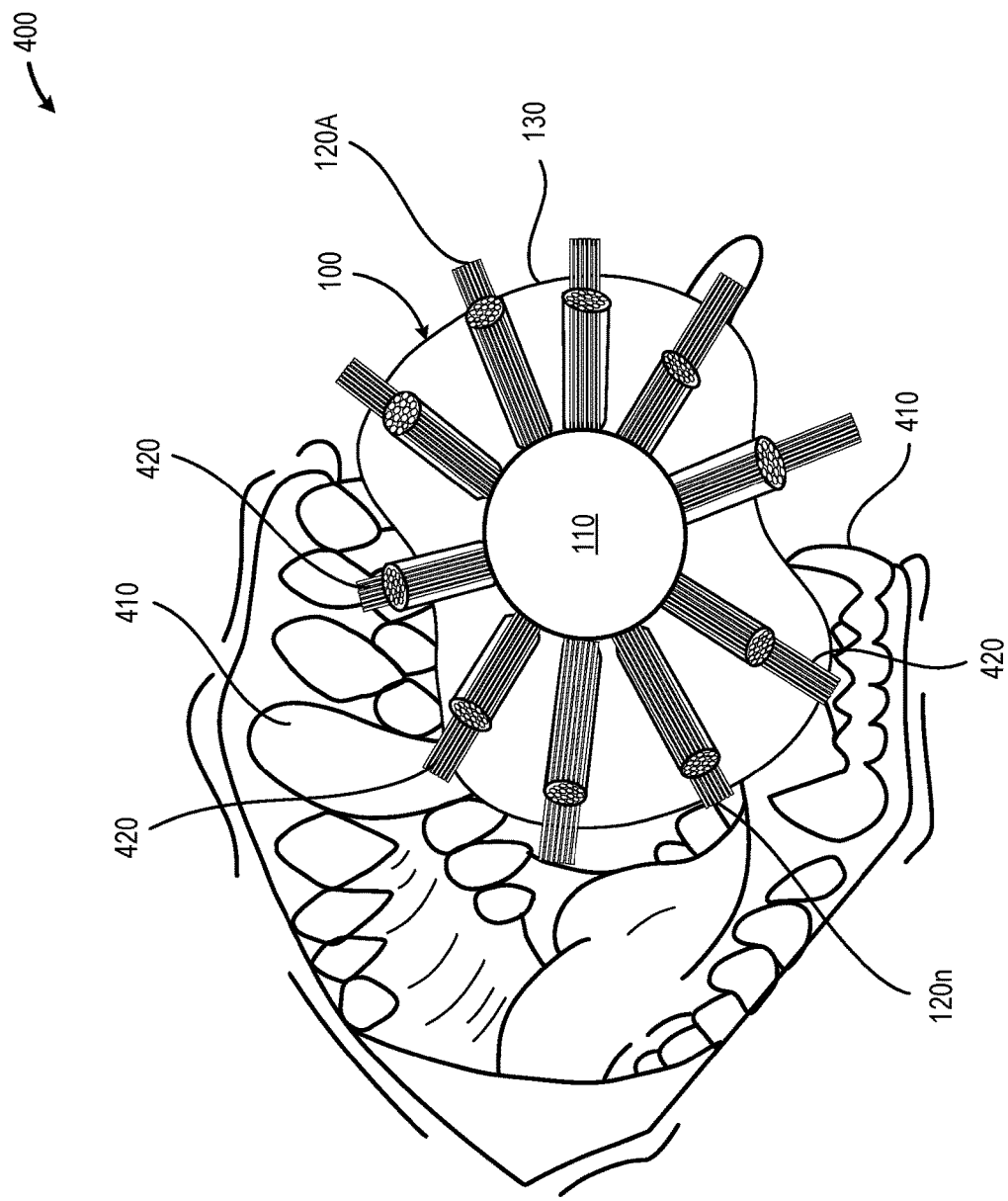
FIG. 4 is a perspective view depicting a canine compressing the illustrative dental chew toy, in accordance with at least one embodiment described herein.

FIG. 4 is a perspective view depicting a canine compressing the illustrative dental chew toy 100, in accordance with at least one embodiment described herein. As depicted in FIG. 4, as the canine bites down on the dental chew toy 100, the canine's teeth 410 compresses the relatively flexible outer cover 130 thereby creating an exposed portion 420 of one or more of the plurality of dental elements 120. The exposed portion 420 of one or more of the plurality of dental elements is preferably 50% or less than the length of the dental elements 120, or 25% or less than the length of the dental elements 120.

The exposed portions 420 of the dental elements 120 contact the surfaces of the canine's teeth 410 and/or gums, stimulating and/or cleaning the teeth and/or gums of the canine. As may be appreciated, if the canine compressed the chew toy 100 further, compression may be imposed on the core 110, which core 110 may preferably contain a dental formulation, which may then be released via apertures 111 (FIG. 2) on or along the dental elements 120. In addition, the canine may cause a compression action on one or more of the dental elements 120, which may then exert a compressive force on the core 110, to promote release of a dental formulation contained therein, through apertures 111 (see again, FIG. 2).

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

Thus, the present disclosure is directed to systems and methods useful for a dental chew toy capable of stimulating and/or cleaning the tooth surfaces and/or gums of a domesticated animal. The dental chew toy includes a plurality of relatively flexible dental elements extending radially outward from a core member. A relatively flexible outer cover surrounds the core member and the plurality of dental elements. A plurality of apertures formed in the outer cover allow passage of the dental elements when the outer cover is compressed via chewing action of the animal. Hollow tubes may preferably surround the dental elements to guide the dental elements through the apertures formed in the outer cover. The dental elements may each include a plurality of bristles.

The following examples pertain to further embodiments. The following examples of the present disclosure may comprise subject material such as at least one device and/or a method or a system for providing a dental chew toy having hidden dental elements that are exposed when a compressible outer cover is compressed via chewing action of a domesticated animal.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

What is claimed:

1. A dental chew toy, comprising:
a core member;
a plurality of dental elements extending radially outward from the core member having a first end engaged to the core member and a second end distal from the core member; and
a flexible outer cover having an outer side and an inner side, and deformable from an uncompressed state to a compressed state in response to a compressive force on the outer cover, the outer cover disposed about the core member and having a plurality of apertures formed therethrough, each of the plurality of apertures disposed proximate the second end of a respective one of the plurality of dental elements;
wherein, when in the compressed state, each of the plurality of dental elements extend outwardly from the inner side of the outer cover, through the respective aperture, to the outer side of the outer cover, and such that a portion of each of the plurality of dental elements is disposed outward of the respective aperture outward of the outer side of the outer cover.

2. The dental chew toy of claim 1, wherein the dental elements comprise a plurality of fibers.

3. The dental chew toy of claim 1, further comprising a plurality of hollow tubes, each of the plurality of hollow tubes disposed about a respective one of the plurality of dental elements.

4. The dental chew toy of claim 3, wherein each of the plurality of hollow tubes comprises a hollow tube formed integral with the outer cover.

5. The dental chew toy of claim 4, wherein, in an uncompressed state, the plurality of dental elements do not extend beyond the outer cover.

6. The dental chew toy of claim 1, wherein the core member comprises a spherical core member having a diameter.

7. The dental chew toy of claim 6, wherein the outer cover comprises spherical outer cover having an outer cover diameter, the outer cover diameter greater than the spherical core member diameter.

8. The dental chew toy of claim 7, wherein the ratio of the outer cover diameter to the spherical core diameter is less than 2.0.

9. The dental chew toy of claim 1, wherein the flexible outer cover comprises silicone elastomer, polyurethane elastomer, polyester elastomer, or natural rubber.

10. The dental chew toy of claim 1, wherein, in an uncompressed state, each of the dental elements includes an exposed portion that extends beyond the outer cover.

11. The dental chew toy of claim 10:
   wherein each of the dental elements have a first length; and
   wherein the exposed portion of each of the dental elements is 25% or less of the first length of said dental elements.

12. The dental chew toy of claim 1, wherein said core member includes one or more apertures.

13. The dental chew of claim 12, wherein said core member includes a one-way valve configured to introduce a formulation into said core member.

14. The dental chew of claim 12, wherein said core member comprises two separate portions that can be releasably mechanically engaged.

15. The dental chew toy of claim 1, wherein said core member includes one or more apertures and contains a formulation that is configured to be released upon compression of said core member.

16. The dental chew toy of claim 15, wherein said formulation comprises a liquid.

17. The dental chew toy of claim 15, wherein said formulation comprises a substance with a viscosity in the range of 500 centipoise to 250,000 centipoise.

* * * * *